United States Patent
Rohner et al.

(10) Patent No.: US 8,896,843 B2
(45) Date of Patent: Nov. 25, 2014

(54) METHOD FOR SPECKLE MITIGATION IN AN INTERFEROMETRIC DISTANCE METER BY DETERMINING A POINTING DIRECTION

(75) Inventors: Marcel Rohner, Herisau (CH); Yves Salvade, St. Imier (CH)

(73) Assignee: Leica Geosystems AG, Heerbrugg (CH)

( * ) Notice: Subject to any disclaimer, the term of this patent is extended or adjusted under 35 U.S.C. 154(b) by 306 days.

(21) Appl. No.: 13/514,210

(22) PCT Filed: Dec. 13, 2010

(86) PCT No.: PCT/EP2010/069481
§ 371 (c)(1), (2), (4) Date: Jun. 6, 2012

(87) PCT Pub. No.: WO2011/073126
PCT Pub. Date: Jun. 23, 2011

(65) Prior Publication Data
US 2012/0242998 A1    Sep. 27, 2012

(30) Foreign Application Priority Data
Dec. 14, 2009    (EP) ..................................... 09179135

(51) Int. Cl.
*G01B 9/02* (2006.01)
*G01S 17/32* (2006.01)

(52) U.S. Cl.
CPC .. *G01B 9/02* (2013.01); *G01S 17/32* (2013.01)
USPC ....................................................... 356/498

(58) Field of Classification Search
CPC ........... G01B 9/02082; G01B 9/02094; G01B 9/02098; G01B 11/162
USPC .......................................... 356/498, 499, 520
See application file for complete search history.

(56) References Cited

U.S. PATENT DOCUMENTS

| | | | |
|---|---|---|---|
| 5,811,826 | A | 9/1998 | Shirley |
| 2006/0012842 | A1 | 1/2006 | Abu-Ageel |
| 2007/0242253 | A1 | 10/2007 | Visser et al. |
| 2008/0204698 | A1 | 8/2008 | Rohner et al. |

FOREIGN PATENT DOCUMENTS

| | | |
|---|---|---|
| CN | 1987342 A | 6/2007 |
| CN | 101055429 A | 10/2007 |
| CN | 101529288 A | 9/2009 |
| JP | 2008-532001 A | 8/2008 |

OTHER PUBLICATIONS

Written Opinion of parent International Patent Application No. PCT/EP2010/069481 issued Jun. 19, 2012.

(Continued)

*Primary Examiner* — Hwa Lee
(74) *Attorney, Agent, or Firm* — Maschoff Brennan

(57) ABSTRACT

A method for speckle mitigation in an interferometric distance meter comprises the steps of transmitting optical radiation with at least one wavelength λ to a target to be surveyed, receiving a portion of the optical radiation scattered back by the target in an optical axis (OA), wherein the optical radiation forms a speckle field, converting the received optical radiation into at least one received signal, determining a true distance to the target from the received signal by absolute or incremental interferometric distance measurements. In the method the true pointing direction relative to the optical axis (OA) is determined, wherein the distance error due to speckle effects is corrected.

16 Claims, 4 Drawing Sheets

(56) References Cited

OTHER PUBLICATIONS

European Search Report dated Apr. 28, 2010 as received in application No. 09179135.
Yamamoto et al., "Profilometry of Sloped Plane Surfaces by Wavelength Scanning Interferometry", Optical Review, May 1, 2002, vol. 9, No. 3, XP019353947, ISSN: 1349-9432, pp. 112-121.
Goodman, "Some Fundamental Properties of Speckle", Journal of the Optical Society of America, Nov. 1, 1976, vol. 66, No. 11, XP002181682, ISSN: 0093-5433, pp. 1145-1150.
Vry et al., "Higher-order statistical properties of speckle fields and their application to rough-surface interferometry", Journal Optical Society of America, vol. 3, No. 7, Jul. 1986.
Salvade, "Distance Measurement by Multiple-Wavelength Interferometry", Thesis, Université de Neuchâtel, Jul. 1999.

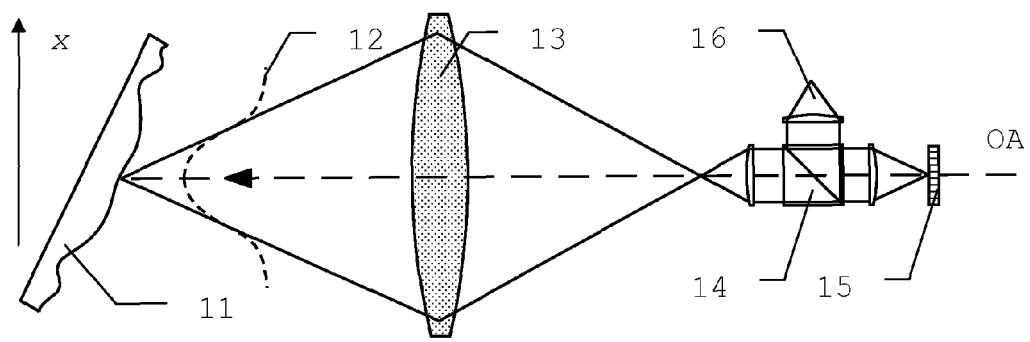
Fig. 1
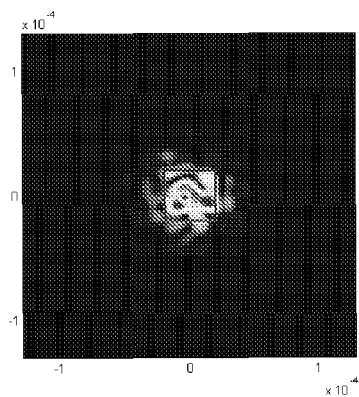    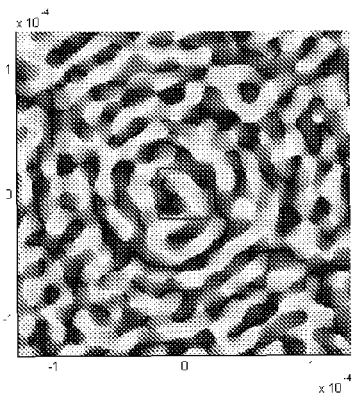
Fig. 2A              Fig. 2B
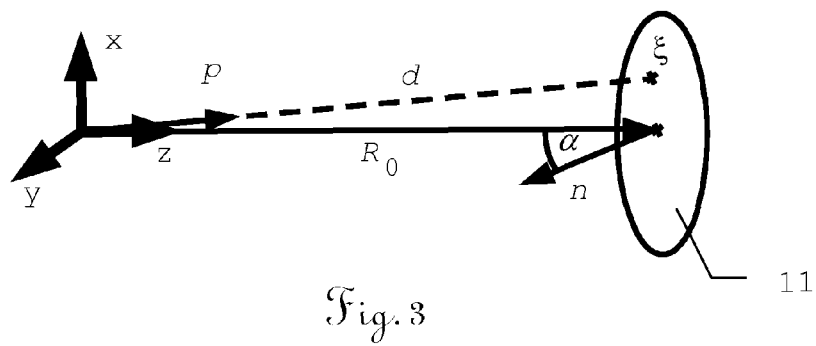
Fig. 3

METHOD FOR SPECKLE MITIGATION IN AN INTERFEROMETRIC DISTANCE METER BY DETERMINING A POINTING DIRECTION

FIELD OF THE INVENTION

The invention relates to a method for speckle mitigation in an interferometric distance meter, and an interferometric distance meter.

BACKGROUND

In the area of electronic distance measurement, various principles and methods are known. One approach consists in emitting frequency-modulated electromagnetic radiation, such as, for example, light, to the target to be surveyed and subsequently receiving one or more echoes from back-scattering objects, ideally exclusively from the target to be surveyed, it being possible for the target to be surveyed to have both specular—for example retroreflectors—and diffuse back-scattering characteristics. In an interferometer arrangement, a laser light source is used for the distance measurement. The signal received is superposed with a second signal which is derived from the emitted light signal. The resulting beat frequency of the mixed product, the interferogram, is a measure of the distance to the target object.

This type of interferometry is a well known technique for electro-optic distance measurements that excels by a very high measurement accuracy and shot-noise limited sensitivity. A variety of further embodiments exists ranging from incremental interferometers that operate at a fixed wavelength, to absolute distance meters that may use a multitude of discrete wavelengths (multi-wavelength interferometry), frequency modulated continuous wave interferometry (FMCW) or white-light interferometry.

Absolute distance meters make use of the sensitivity of the interferometric phase $\phi$ on the wavelength $\lambda$. In the embodiment which is simplest in principle, the optical frequency of the laser source is tuned linearly. As shown below, the distance d—for small wavelength changes—is obtained from $$d = -\frac{\lambda^2}{4\pi}\frac{d\phi}{d\lambda} \tag{1}$$

The following discussion also applies to multi-wavelength interferometry, where the phase-differences at several wavelengths are measured simultaneously. For the case of two discrete wavelengths $\lambda_1$, $\lambda_2$, in equation (1) it can be substituted as follows $d\lambda=\lambda_2-\lambda_1$, $d\phi=\phi_2-\phi_1$, $\lambda=\sqrt{\lambda_1\lambda_2}$.

When this technique is applied to non-cooperative targets, well-known effects, so called speckles, emerge that cause a deterioration of measurement accuracy. They appear as stochastic measurement fluctuations that are given by the depth variations within the measurement area, i.e. due to target roughness and target tilt with respect to the measurement beam. These effects are due to randomization of the interferometric phase $\phi$ caused by speckles that result from the coherency of the laser-light, which—according to equation (1)—causes a measurement error. The effect occurs to lesser extent with electro-optic distance measurement techniques that use incoherent light—such as classical phase-meter or TOF technologies—where speckle averaging acts to reduce the observed distance variations. Unfortunately, these incoherent techniques have other disadvantages—such as limited measurement accuracy or limited measurement sensitivity—which prevent the replacement of the interferometric techniques.

In prior art a lot of work has been devoted to the problem of randomization of the amplitude, since it may lead to missing detection situations due to destructive interference. In fact, it was shown in W. Goodman, "Some fundamental properties of speckle," J. Opt. Soc. Am, Vol. 66, No. 11, 1976, p. 1145ff, that the intensity I at each detector location follows an exponential distribution with density function $$p(I) = \frac{1}{\langle I \rangle}\exp(-I/\langle I \rangle) \tag{2}$$

and therefore, the probability density of the interferometric amplitude $A \propto \sqrt{I}$ follows a Rayleigh-type distribution $p(A)=p(I(A)) \cdot dI/dA$ $$p(A) = \frac{2A}{\langle A^2 \rangle}\exp\left(-\frac{A^2}{\langle A^2 \rangle}\right) \tag{3}$$

Consequently, the probability of detecting insufficient light to perform a measurement can be high. The methods used to mitigate the effect of these amplitude fluctuations are based on the measurement of decorrelated speckle patterns—a method often termed speckle diversity.

However, the problem of phase randomization has not attracted as much work as the problem of the amplitude variations. For the context of multi-wavelength interferometry in U. Vry and A. F. Fercher, "Higher-order statistical properties of speckle fields and their application to rough-surface interferometry," J. Opt. Soc. Am. A 3 (1986), p. 988ff a decorrelation of the optical phase with a change of wavelength is revealed which—since the phase is related to distance—leads to distance fluctuations.

According to Y. Salvadé, "Distance Measurement by Multiple Wavelength Interferometry," Thesis, University of Neuchâtel, 1999, the normalized correlation coefficient of the speckle field at two wavelengths $\lambda_1$, $\lambda_2$ corresponding to the synthetic wavelength $\Lambda=\lambda_1\cdot\lambda_2/(\lambda_1-\lambda_2)$ for an imaging configuration as illustrated in FIG. 1 is given by $$\mu(x) = C_P\left[\frac{\lambda}{M\Lambda}(x-2d_I\tan\alpha)\right]\exp\left[\frac{2\pi i}{\Lambda}d(x)\right]\cdot\exp\left(-\frac{4\pi^2}{\Lambda^2}\cdot 2\sigma_h^2\right) \tag{4}$$

where $\sigma_h$ is the target roughness, $\alpha$ the target tilt angle relative to the optical axis, $C_p$ the normalized autocorrelation of the pupil function, $d_I$ the distance from the lens to the image plane, M the magnification of the imaging optics, d(x) contains the systematic distance/height profile of the target:

$$d(x) = 2d_0 + d_I - 2\tan\alpha\cdot\frac{x}{M} + \frac{|x|^2}{2d_I}\left(1+\frac{1}{M}\right) \tag{5}$$

The variance of the interferometric phase difference between measurements at the two wavelengths is then given by $$\sigma_\phi^2 = \frac{\pi^2}{3} - \pi \arcsin|\mu| + \arcsin^2|\mu| - \frac{1}{2}\sum_{n=1}^{\infty}\frac{\mu^{2n}}{n^2} \quad (6)$$

According to (1), this causes stochastic range fluctuations when measuring on rough, tilted targets. Indeed, the standard uncertainty of the measured distance can be roughly estimated by $$\sigma_z \approx \frac{\delta x}{2}\tan\alpha \quad (7)$$

where $\delta x$ and $\alpha$ are the resolution of the imaging system and the tilt angle, respectively.

In U.S. Pat. No. 5,811,826 a method and an apparatus for remotely sensing the orientation of a plane surface from measuring the speckle pattern of a coherent light beam reflected off the surface are disclosed. The surface is illuminated with radiation of two different frequencies and the corresponding speckle patterns are compared to determine the magnitude and direction of shift from the first speckle pattern to the second. Magnitude and direction of the speckle pattern shift indicates the orientation of the object, i.e. the method measures the lateral shift of the speckle pattern when changing the optical frequency from a first frequency $f_1$ to a second frequency $f_2$ in order to calculate the angle of incidence and the azimuthal angle of the surface.

Although this approach allows a determination of surface properties, like its orientation, the method is based on the use of two different wavelengths at different times whose spectral characteristics have to lead to a sufficient lateral shift of the pattern.

SUMMARY

An object of the invention is to provide an improved interferometric distance measurement method, particularly for use with tilted targets, and a correspondingly designed interferometric distance meter.

A further object is to provide a method and a distance meter that are able to determine properties of a speckle field with only one single wavelength or with more than one wavelength at the same time or without a change of wavelengths.

The present invention relates to a method for speckle mitigation in an interferometric distance meter where the properties of the speckle field are employed to determine the pointing direction of each distance measurement.

In contrast to prior art and according to the current invention, the speckle pattern is measured at a single wavelength to correct for speckle induced measurement errors without determining the orientation of the surface. Nevertheless, the invention is not restricted to the use of one single frequency and the use a plurality of frequencies is also claimed.

Thereby, the invention employs statistical properties of the speckle field with a certain similarity to the approach of U.S. Pat. No. 5,811,826. However, in contrast to this method no measures of the surface properties are taken, but rather a pointing direction is calculated from the measurement at a single frequency—rather than two frequencies. Nevertheless, the invention is not restricted to the use of one single frequency and it is also possible to use a plurality of frequencies.

The invention deals with reducing the range fluctuations when measuring the distance to targets that are tilted with respect to the optical axis using interferometric absolute distance sensors. The method achieves a measurement accuracy that is primarily limited by the target roughness, rather than the total depth distribution within the measurement spot. The technique avoids the distance errors caused by phase decorrelation effects as in equation (6) that to date has been perceived as unavoidable.

In essence, phase decorrelation errors are compensated for by pointing angle corrections based on measurements of the speckle field. Due to speckles, the "centroid" of the measurement is not on the optical axis, but rather slightly offset from the optical axis. By resolving the speckle pattern by either a plurality of detectors or scanning means that move at least one detector relative to the speckle field, the centroid—or pointing direction—is calculated according to the method described in the sequel. Each interferometric distance measurement is tagged with a corresponding correction of the pointing direction, thereby correcting for the phase decorrelation errors, i.e. determining the pointing directions to a plurality of points which are at least partially resolving the speckle field. In principle, the measurement or estimation of pointing directions can be performed in parallel or sequentially, e.g. scanning. Thereby the speckle field is resolved with the granularity or resolution of the distribution of points. The statistics or the distribution of pointing directions allows a compensation or correction of phase decorrelation errors.

In summary, the method according to the invention involves determining the pointing direction to at least one point of the speckle field relative to the optical axis, wherein the speckle field is at least partially resolved, in particular using a plurality of K detectors or by moving at least one detector relative to the speckle field.

For a parallel measurement of distance and pointing direction and in the terms defined in FIG. 3 this means that the sensor does not provide the distance to the target $R_0$ at the optical axis, but rather the distance d at an offset direction to the point $\xi$ and—in addition—the corresponding angular offset p off the optical axis. The direction compensation can be easily accounted for in standard point-cloud processing software, e.g. as angular correction of spherical coordinates provided by a scanner mechanism.

Interferometric measurement systems suffer from the bat-wing effect: When scanning across a step-like feature the measured distance may over- and overshoot, as illustrated in FIG. 8, yielding large measurement errors. In the context of the present invention, this effect is related to the fact that the pointing direction becomes function of the laser wavelength. In the presence of a step-feature, this may cause a large change of the interferometric phase versus wavelength, $d\phi/d\lambda$, resulting—according to equation (1)—in a large measurement error.

This type of measurement error can be detected by observing the pointing direction while tuning the laser wavelength. Those measurements that show a large sensitivity of pointing direction to laser wavelength are identified to potentially suffer from the bat-wing effect. FIG. 9 shows example data of measurement error versus sensitivity of pointing direction versus wavelength, demonstrating the strong correlation between the two figures.

Sensors that present the state-of-the-art, measure the distance d rather than the distance $R_0$ on the optical axis resulting in a distance error $R_0-d$. This error becomes non-negligible if the target is tilted with respect to the optical axis. Therefore, the inventive concept provides a significant enhancement of measurement accuracy in these situations.

Below it is shown that the wavelength dependency of the speckle phase depends on the static light distribution at a certain wavelength. Furthermore, it is shown that the measurement error caused by the stochastic phase-change can be compensated by a proper choice of pointing direction.

The following conventions are used $A(x) \in \mathbb{C}$ Position dependent field ($x \in \mathbb{R}^2$: detector position)

$A_k \in \mathbb{C}$ Detected signal of detector k, $$A_k := \int_{D_k} A(x) d^2 x$$

$A \in \mathbb{C}$ Total interferogram $$\sum_k A_k$$

$D_k$ Active area of detector k
D $$\text{Total detector area,} = \bigcup_{k=1}^{K} D_k$$

$x_k \in \mathbb{R}^2$ Center coordinate of the active area of detector k

For simplicity the case of a tilted target as shown in FIG. 3 is assumed.

Then, the distance $d=|\xi|$ to the point $\xi$ in pointing direction p is obtained from the equations $n \cdot [\xi - [0\ 0\ R_0]^T] = 0$, $$\xi = d \frac{p}{|p|}$$

as $$d = \frac{n^T \cdot [0\ 0\ R_0]^T}{n^T \cdot p/|p|} \tag{8}$$

The tilt angle $\alpha$ is related to the components of the normal vector $$\tan\alpha = \frac{\sqrt{n_x^2 + n_y^2}}{n_z} \tag{9}$$

For pointing vectors close to the z-axis the following estimation can be used $$p = \frac{1}{\sqrt{1 + p_x^2 + p_y^2}} \begin{bmatrix} p_x \\ p_y \\ 1 \end{bmatrix} \approx \left[ \frac{1}{\sqrt{1 + p_x^2 + p_y^2}} \begin{bmatrix} p_x \\ p_y \\ 1 \end{bmatrix} \right] \tag{10}$$

Each pointing direction is associated with a position in the detector plane $$x = -d_l \begin{bmatrix} p_x \\ p_y \end{bmatrix} \tag{11}$$

where $d_l$ the distance of the principal plane to the image plane, for a scanning system this has to be adapted to optical paths to positions of points in the scanning path. The distance d thus deviates from the distance $R_0$ at the optical axis $$d = R_0 \frac{n_z}{\frac{n_x \cdot p_x + n_y \cdot p_y}{\sqrt{1 + p_x^2 + p_y^2}} + n_z} \approx R_0 \left[ 1 - \frac{n_x \cdot p_x + n_y \cdot p_y}{n_z} \right] \tag{12}$$

Introducing the magnification $M=d_l/R_0$, and the object coordinates $x_o=x/M$:

$$d = R_0 - \frac{R_0}{d_l \cdot n_z}[n_x\ n_y] \cdot x = R_0 - \frac{1}{M \cdot n_z}[n_x\ n_y] \cdot x \tag{13}$$

$$= R_0 - \frac{1}{n_z}[n_x\ n_y] \cdot x_0$$

The distance obtained from the—not normalized—interferometric phase change $d\phi$ is given by equation (1)

$$d = -\frac{\lambda^2}{4\pi} \frac{d\phi}{d\lambda} \tag{1}$$

This approximation holds for small wavelength changes $d\lambda$. The complex amplitude of the detected interferogram is given by $$A := \int_D A(x) d^2 x, \tag{14}$$

where D is the total detector area and the complex amplitude impinging on the detector is given by $$A(x) = \int_{D/M} d^2 x_o \cdot V(x_o) \cdot O(x_o; \lambda) \cdot \rho(x_o) \cdot h(x + M \cdot x_o) \tag{15}$$

$$= \frac{1}{M^2} \int_D d^2 x' \cdot V(x'/M) \cdot O(x'/M; \lambda) \cdot \rho(x'/M) \cdot h(x + x')$$

$$= \int_D d^2 x' \cdot \tilde{V}(x') \cdot \tilde{h}(-x - x') = (\tilde{V} * \tilde{h})(-x)$$

where * denotes (2-dimensional euclidean) convolution and where the following definitions have been used $$\tilde{V}(x) \equiv \tilde{V}(x; \lambda) := \frac{1}{M^2} \cdot V(x/M) \cdot O(x/M; \lambda) \cdot \rho(x/M), \tilde{h}(x) := h(-x) \tag{16}$$

In (15) the illumination wave V encodes the absolute time and distance information; for a plane follows $$V(x, t) = V_0 \cdot e^{j\frac{2\pi}{\lambda}(ct - 2R_0)} \quad (17)$$

As usual in optics, the harmonic time dependence is discarded, so that $$V(x) = V_0 \cdot e^{-j\frac{4\pi}{\lambda}R_0}.$$

The function p(x) describes the microscopic structure of the object, which has a negligible wavelength dependence within the small wavelength changes considered here. The impulse response h(x) of the imaging system is also assumed not to depend on the wavelength in a relevant way. The object function $$O(x_o; \lambda) = O_o(x_o) \cdot \exp\left[j\frac{4\pi}{\lambda}\frac{1}{n_z}[n_x \ n_y] \cdot x_o\right] \quad (18)$$

describes the non-stochastic part of the height profile of the object (a tilted plane), it derives from equation (13) and is the relevant term regarding wavelength dependency.

The following relation is needed later on:

$$\frac{dO(x_o; \lambda)}{d\lambda} = O(x_o; \lambda) \cdot \left[-j\frac{4\pi}{\lambda^2}\frac{1}{n_z}[n_x \ n_y] \cdot x_o\right] \quad (19)$$

In the sequel, it is assumed that integrals of the amplitude A(x)—defined in equation (15)—over the individual detector areas $D_k$ can be measured. Using equation (19), the derivative of A(x) with respect to wavelength is $$\frac{dA(x)}{d\lambda} = -j\frac{4\pi}{\lambda^2}\frac{1}{n_z}[n_x \ n_y]\int_{D/M} d^2x_o \cdot x_o \cdot M^2 \cdot \tilde{V}(M \cdot x_o) \cdot h(x + M \cdot x_o) - j\frac{4\pi}{\lambda^2}R_0 A(x) \quad (20)$$

$$= -j\frac{4\pi}{\lambda^2}\frac{1}{M \cdot n_z}[n_x \ n_y]\int_D d^2x' \cdot x' \cdot \tilde{V}(x') \cdot h(x + x') - j\frac{4\pi}{\lambda^2}R_0 A(x)$$

As a special case, we consider a receiver optics with high resolving power, $h(x) = \delta(x)$, such that equations (15) and (20) simplify to $$A(x) = \frac{1}{M^2}V(-x/M) \cdot O(-x/M; \lambda) \cdot \rho(-x/M) = \tilde{V}(-x), \quad (21)$$

$$\frac{dA(x)}{d\lambda} = j\frac{4\pi}{\lambda^2}\frac{1}{M \cdot n_z}[n_x \ n_y] \cdot x \cdot A(x) - j\frac{4\pi}{\lambda^2}R_0 A(x)$$

The phase of the interferogram is the phase of the amplitude as given in equation (14):

$$\phi = \arg A = \arctan 2(Im\, A, Re\, A) \quad (22)$$

If the optical wavelength $\lambda$ is changed the phase changes as $$\frac{d\phi}{d\lambda} = Im\left[\frac{1}{A}\frac{dA}{d\lambda}\right] \quad (23)$$

The formal equivalence of phase decorrelation and pointing direction can now be shown by inserting equation (20) in equation (23) and using (14) which yields $$\frac{d\phi}{d\lambda} = -\frac{4\pi}{\lambda^2}\frac{1}{M \cdot n_z}[n_x \ n_y] \cdot Re\left[\frac{\int_D d^2x' \cdot x' \cdot \tilde{V}(x') \cdot \int_D d^2x \cdot h(x + x')}{\int_D A(x)d^2x}\right] - \quad (24)$$

$$\frac{4\pi}{\lambda^2}R_0 \stackrel{\int d^2x \cdot h(x+x') = 1}{\approx} -\frac{4\pi}{\lambda^2}\frac{1}{M \cdot n_z}[n_x \ n_y] \cdot$$

$$Re\left[\frac{\int_D d^2x' \cdot x' \cdot \tilde{V}(x')}{\int_D A(x)d^2x}\right] - \frac{4\pi}{\lambda^2}R_0$$

It has to be noted that by equation (15), $\tilde{V}$ is the deconvolution of A(−x) with respect to $\tilde{h}$: $(\tilde{V}*\tilde{h})(x) = A(-x)$.

If the approximation (21) is used rather than (20) the simpler relation is derived $$\frac{d\phi}{d\lambda} = \frac{4\pi}{\lambda^2}\frac{1}{M \cdot n_z}[n_x \ n_y] \cdot Re\left[\frac{\int_D x \cdot A(x)d^2x}{\int_D A(x)d^2x}\right] - \frac{4\pi}{\lambda^2}R_0 \quad (25)$$

Equations (24) and (25) are equivalent under the mild symmetry condition $$\int xh(x)d^2x = 0 \quad (26)$$

which is certainly satisfied if $h(x) = h(-x)$. To show this, it can be rewritten $$\int_D x \cdot A(x)d^2x = \quad (27)$$

$$\int_D d^2x \cdot x \cdot \int_D d^2x' \cdot \tilde{V}(x') \cdot h(x + x') \stackrel{x''=x+x'}{\underset{d^2x''=d^2x}{=}} \int_D d^2x' \cdot \tilde{V}(x')$$

$$\int_{D+x'} d^2x'' \cdot (x'' - x') \cdot h(x'') \stackrel{\int xh(x)d^2x = 0}{\approx} -\int_D d^2x' \cdot \tilde{V}(x') \cdot x'$$

Therefore, the simple relation (25) applies in all cases, where the impulse response obeys the simple symmetry condition (26). This is true in virtually all optical systems of practical interest and in particular extends to the case of defocus.

The distance that is calculated based on the interferometric phase gradient $d\phi/d\lambda$ is obtained by inserting (25) in (1), yielding $$d = \frac{-1}{Mn_z}[n_x \; n_y] \cdot \text{Re}\left[\frac{\int_D x \cdot A(x) d^2 x}{\int_D A(x) d^2 x}\right] + R_0, \tag{28}$$

It has to be noted that (28) does not depend on a constant phase-offset in A(x). This observation will be used in the description of the embodiments.

Comparison with equation (13) reveals that (28) is equivalent to a pointing correction corresponding to a detector position that is obtained by weighting the detected field A(x) with the factor $$S(x) := \text{Re}\left[A(x) \Big/ \int_D A(x) d^2 x\right], \; x_p =: \int_D x \cdot S(x) d^2 x \tag{29}$$

This correlation between the wavelength dependent interferometric phase with the static structure of the correlation pattern at wavelength λ is quite noteworthy and it is the basis of the inventive speckle mitigation technique.

The pointing direction can be estimated by using a detector array as set forth below. In practice, a detector array has a number K of detectors, indexed by k, covering the areas $D_k$ (such that $$\bigcup_{k=1}^{K} D_k = D)$$

that yield the signals $A_k = \int_{D_k} A(x) d^2 x$, $1 \le k \le K$.

The problem is then to estimate $x_p$ as defined in (29) from $A_k$ and $A = \sum_{k=1}^{K} A_k$.

For convenience, the vectors $$\mathcal{A} = [A_1 A_2 \ldots A_K]^T \in \mathbb{C}^K \text{ and } \mathcal{A}_0 = \int_D x \cdot A(x) d^2 x \in \mathbb{C}^2 \tag{30}$$

can be introduced. If the measured value is denoted by $\tilde{\mathcal{A}} \in \mathbb{C}^K$, a plausible conjecture is that the optimum $x_p$ is given by its expectation conditioned on the observations $A_k$:

$$\hat{x}_P := \left\langle \text{Re}\frac{\mathcal{A}_0}{1^T \mathcal{A}} \Big| \mathcal{A} = \tilde{\mathcal{A}} \right\rangle = \text{Re}\frac{\langle \mathcal{A}_0 | \mathcal{A} = \tilde{\mathcal{A}} \rangle}{1^T \tilde{\mathcal{A}}} \in \mathbb{R}^2 \tag{31}$$

where $1 \in \mathbb{C}^K$ is the vector of all ones. By the usual assumptions of speckle theory, the random vector $$\begin{bmatrix} \mathcal{A}_0 \\ \mathcal{A} \end{bmatrix} \in \mathbb{C}^{K+2}$$

is zero mean jointly proper Gaussian. To compute the conditional expectation of $\mathcal{A}_0$, the covariance matrices are needed $$C := \text{cov}[\mathcal{A}, \mathcal{A}] \in \mathbb{C}^{K \times K}, B := \text{cov}[\mathcal{A}_0, \mathcal{A}] \in \mathbb{C}^{2 \times K}. \tag{32}$$

These matrices are functions of the measurement conditions, but since they are—according to simplified speckle models—independent of the properties of the measured target, they can be pre-computed. They are defined by $$C = (C_{i,k}), \tag{33}$$

$$C_{i,k} = \langle \mathcal{A}_i \mathcal{A}_k^* \rangle = \int_{D_i} d^2 x \int_{D_k} d^2 y \langle A(x) A(y)^* \rangle \in \mathbb{C},$$

$$B = (B_{:,k}),$$

$$B_{:,k} = \langle \mathcal{A}_0 \mathcal{A}_k^* \rangle = \int_D d^2 x \int_{D_k} d^2 y \cdot x \langle A(x) A(y)^* \rangle \in \mathbb{C}^2$$

where the bracket $\langle \; \rangle$ denotes expectation, the asterisk * denotes complex conjugate, and $B_{:,k}$ is the k-th column of the matrix B.

If the correlation length of the random structure of the object is negligibly small, it can be assumed $$\langle \rho(x) \rho(y) \rangle = \kappa \cdot \delta(x-y) \tag{34}$$

for some unimportant constant κ, where δ is the Dirac distribution. This is the basic requirement to render the correlation matrices independent of the surface structure of the measured object. After some standard computation, the field in the image plane can be derived $$\langle A(x) A(y)^* \rangle = c \cdot e^{j 2 \frac{\pi}{\lambda} \frac{|x|^2 - |y|^2}{2 d_I}(1 + \frac{1}{M})} \cdot \hat{I}_P\left(\frac{x-y}{\lambda d_I}\right) \tag{35}$$

where $x, y \in \mathbb{R}^2$ are detector coordinates, $$c = \frac{\kappa |V_0|^2}{\lambda^2 d_I^2}$$

is another unimportant constant and $\hat{I}_P$ is the Fourier transform of the function $I_P(x) = |P(x)|^2$, where P is the pupil function (usually the characteristic function of the pupil, so that $I_P = P$).

From (33) and (35) we get $$C_{i,k} = c \int_{D_i} d^2 x \int_{D_k} d^2 y \cdot e^{j\beta(|x|^2 - |y|^2)} \hat{I}_P\left(\frac{x-y}{\lambda d_I}\right), \tag{36}$$

$$B_{:,k} = c \int_D d^2 x \int_{D_k} d^2 y \cdot x \cdot e^{j\beta(|x|^2 - |y|^2)} \hat{I}_P\left(\frac{x-y}{\lambda d_I}\right),$$

$$\beta = \frac{\pi}{\lambda} \frac{1 + 1/M}{d_I}$$

For the case that the $D_i$ are adjacent rectangles $$D_i = x_i + R, R = (-b_1/2, b_1/2) \times (-b_2/2, b_2/2) \subset \mathbb{R}^2 \tag{37}$$

with barycenters $$x_i = \frac{1}{|D_i|} \int_{D_i} x d^2 x \in \mathbb{R}^2 \tag{38}$$

it can be written $$C_{i,k} = c \int_R d^2x \int_R d^2y \cdot e^{j\beta(|x_i+x|^2 - |x_k+y|^2)} \hat{I}_P\left(\frac{x_i - x_k + x - y}{\lambda d_I}\right), \quad (39)$$

$$B_{:,k} = c \int_D d^2x \int_R d^2y \cdot x \cdot e^{j\beta(|x|^2 - |x_k+y|^2)} \hat{I}_P\left(\frac{x - x_k - y}{\lambda d_I}\right)$$

$$= \sum_{k=1}^{K} x_i C_{i,k} + c \sum_{i=1}^{K} \int_R d^2x \int_R d^2yx \cdot e^{j\beta(|x_i+x|^2 - |x_k+y|^2)} \hat{I}_P$$

$$\left(\frac{x_i - x_k + x - y}{\lambda d_I}\right)$$

hence $$B = XC + \tilde{B}, X := [x_1, \ldots, x_K] \in \mathbb{R}^{2 \times K}, \tilde{B} \in \mathbb{C}^{2 \times K}, \quad (40)$$

$$\tilde{B}_{:,k} = c \sum_{i=1}^{K} \int_R d^2x \int_R d^2yx \cdot e^{j\beta(|x_i+x|^2 - |x_k+y|^2)} \hat{I}_P\left(\frac{x_i - x_k + x - y}{\lambda d_I}\right)$$

Since the random vector $$\begin{bmatrix} \mathcal{A}_0 \\ \mathcal{A} \end{bmatrix} \in \mathbb{C}^{K+2}$$

is zero mean jointly proper Gaussian, the conditional expectation of $\mathcal{A}_0 \in \mathbb{C}^2$ is given by $$\langle \mathcal{A}_0 | \mathcal{A} = \mathcal{A} \rangle = BC^{-1} \mathcal{A} = (X + \tilde{B}C^{-1}) \mathcal{A}. \quad (41)$$

With (31) the result is finally $$\hat{x}_p = \text{Re}\left[\frac{(X + \tilde{B}C^{-1})\tilde{\mathcal{A}}}{1^T \tilde{A}}\right]. \quad (42)$$

It has to be noted that the matrices $X, \tilde{B}, C^{-1}$ can be computed in advance, since they are independent of the properties of the measured target, provided that (34) applies.

The pointing direction is then, using (11), $$p = \frac{\begin{bmatrix} -\hat{x}_p \\ d_I \end{bmatrix}}{\sqrt{d_I^2 + |\hat{x}_p|^2}} \in \mathbb{R}^3, |p| = 1. \quad (43)$$

Two special cases are discussed in the following sections.

A simplified pointing correction is possible if a uniform speckle field is assumed.

If the speckle field is resolved at a high resolution ($K \to \infty$), such a uniform speckle field at each detector can be assumed, such that by (31)

$$\hat{x}_p \approx \text{Re}\left[\frac{\sum_{k=1}^{K} x_k \cdot \tilde{A}_k}{\sum_{k=1}^{K} \tilde{A}_k}\right] = \text{Re}\left[\frac{X\tilde{A}}{1^T \tilde{A}}\right] = X \cdot \text{Re}\left[\frac{\tilde{A}}{1^T \tilde{A}}\right] \quad (44)$$

which is the special case $\tilde{B}=0$ of equation (42). In this limiting case, the matrices $\tilde{B}$ and $C^{-1}$ are not needed, and the method becomes insensitive to the focusing conditions.

The other case refers to a single-speckle system with quadrant detection.

Equations (42) and (44) suggest that a reasonable approximation of $\hat{x}_p$ could be $$\hat{x}_p \approx r_0 \cdot X \cdot \text{Re}\left[\frac{\tilde{A}}{1^T \tilde{A}}\right] \quad (45)$$

for some empirical scalar parameter $r_0$.

In summary, prior art assumes that the distance measured by an interferometric distance measuring instrument is associated with the optical axis of the emitted beam. However, above derivation reveals, that the distance determined by any interferometric distance measuring instrument, that determines distance by conventional means, is in fact associated with a pointing direction that is offset from the optical axis. By correcting the measuring direction according to the pointing direction, which can be determined according to the present invention, e.g. the effect of target orientation can be compensated without actually determining the orientation of the measured target. The primary scope of the present invention is the determination of the pointing direction which is, according to the present invention, not necessarily involving an explicit determination of the target orientation.

In other words, the present invention relates to a method for speckle mitigation in an interferometric distance meter comprising the steps:
  transmitting optical radiation with at least one wavelength $\lambda$ to a target to be surveyed;
  receiving a portion of the optical radiation scattered back by the target in an optical axis, wherein the optical radiation forms a speckle field;
  converting the received optical radiation into at least one received signal and
  determining a true distance to the target from the received signal by absolute or incremental interferometric distance measurements with compensation of phase decorrelation errors.

The method involves determining a pointing direction of the interferometric measurement to at least one point of the speckle field, which point is associated with the interferometric distance measurement, in particular the point being a centroid of the speckle field, relative to the optical axis, wherein the speckle field is at least partially resolved, in particular using a plurality of K detectors or by moving at least one detector relative to the speckle field.

It can also be said, that by determining the pointing direction according to the present application, a step of determining the precise direction to the target to which the distance has been determined can be accomplished. This precise direction, which can deviate from the optical axis of the emitted beam, can be taken into account in the distance determination.

BRIEF DESCRIPTION OF THE DRAWINGS

The method and the distance meter according to the invention is shown schematically below by means of drawings and described in more detail purely by way of example. Specifically, FIG. 1 shows the basic principle of interferometric distance meters measuring to tilted rough surfaces;

FIG. 2A-B show examples for speckle patterns observed in the detector plane for a multi-speckle system;

FIG. 3 shows the geometric relations underlying a compensation of pointing direction;

DETAILED DESCRIPTION

Figure 4:
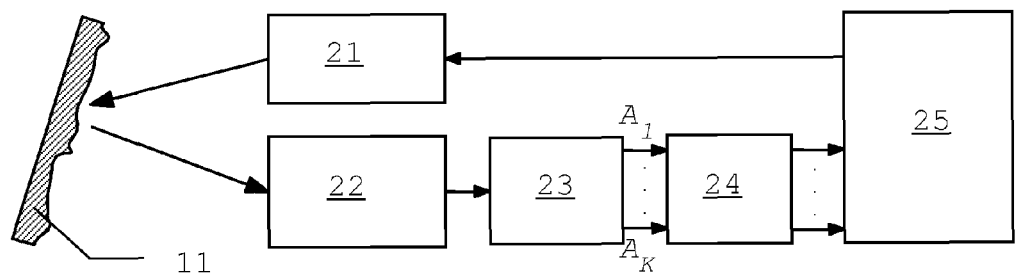
FIG. 4 shows an abstract system overview for a interferometric distance meter.

FIG. 1 shows the basic principle of interferometric distance meters measuring to tilted rough surfaces. A measurement beam 12 with at least one wavelength λ is sent from a radiation source 16 to a non-cooperative target 11 that has to be surveyed and where the optical radiation forms a speckle field. The target 11 is microscopically rough and not angularly aligned to the optical axis such that the optical phase of the reflected light becomes randomized. A portion of the optical radiation scattered back by the target 11 is received and partially collected in an optical axis OA by the imaging lens 13, travels through the LO combiner optics 14, and eventually is imaged to a receiver 15 in an image plane, where it interferes with the reference beam from the radiation source 16 for absolute or incremental interferometric distance measurements. The so received optical radiation is converted by the receiver 15 into at least one received signal which allows determining a true distance to the target 11. According to the invention phase decorrelation errors are compensated by determining pointing directions to a plurality of points and relative to the optical axis OA wherein the points are at least partially resolving the speckle field on the target 11.

This configuration is exemplary and the arguments that follow apply to other imaging configurations as well. As shown in the following figures, it is possible to use a multi-channel data-acquisition system as receiver 15 for acquiring the detector signals $A_k$ individually and perform all operations digitally or also a 2×2 quadrant detector for resolving a single-speckle image or a single channel detector that is moved over the speckle field measuring pointing directions sequentially.

The appearance of speckle fields formed on the target is illustrated in FIGS. 2A-B as examples observed in the detector plane for a multi-speckle system.

Depending on the configuration of the emission of the measurement beam and the imaging optics, a speckle pattern will be observed in the detector plane that has a granular appearance with a number of bright and dark spots. If—on average—there is a single predominant bright spot, this pattern can be called a single-speckle system. In the case shown in FIGS. 2A-B multiple speckles are observed—which are designated as a multi-speckle system. Here, in FIG. 2A the intensity distribution and in FIG. 2B the spatial distribution of optical phase are shown.

As exemplified here, speckles cause a randomization of both the intensity and the phase of the received field at the image plane. The specific appearance depends on the microscopic characteristics of the target at the measurement beam location, such that it may be considered as random for most cases and surfaces.

FIG. 3 shows the geometric relations underlying a compensation of pointing direction. The axes of a coordinate system are designated with x, y and z wherein the z-axis points towards the target 11. $R_0$ designates the true target distance, n a vector normal to target plane and p the pointing direction of a current measurement. This means that the receiver or sensor does not provide the true distance to the target $R_0$ at the optical axis, but rather the distance d at an offset direction to a point ξ and—in addition—the corresponding angular offset p off the optical axis. The direction compensation can be easily accounted for in standard point-cloud processing software, e.g. as angular correction of spherical coordinates provided by a scanner mechanism. Sensors that present the state-of-the-art, measure the distance d rather than the distance $R_0$ on the optical axis resulting in a distance error $R_0-d$. This error becomes non-negligible if the target is tilted with respect to the optical axis. Therefore, the invention provides a significant enhancement of measurement accuracy in these situations.

FIG. 4 shows an abstract system overview for a interferometric distance meter where the components are designated as follows 21 Illumination optics
22 Imaging optics
23 Set of K detectors
24 Signal acquisition
25 Signal processing In a preferred first embodiment an imaging optical system with a number K of detectors is used for resolving the speckle pattern. In contrast to scanning systems, that are also suitable for the realising the inventive concept, this setup allows a parallel acquisition of signals which is beneficial under non-stable and dynamic conditions. The sensor signals $A_k$ can be used directly to evaluate the pointing direction p according to equation (42). If the speckle pattern is finely resolved, e.g. by a large number of small detectors, a uniform field distribution may be assumed within each detector area, yielding a signal processing that becomes insensitive to the correlation structure of the received speckle pattern, albeit at the expense of a large number of detectors. For a single-speckle system, a conventional quadrant detector can be used.

Figure 5:
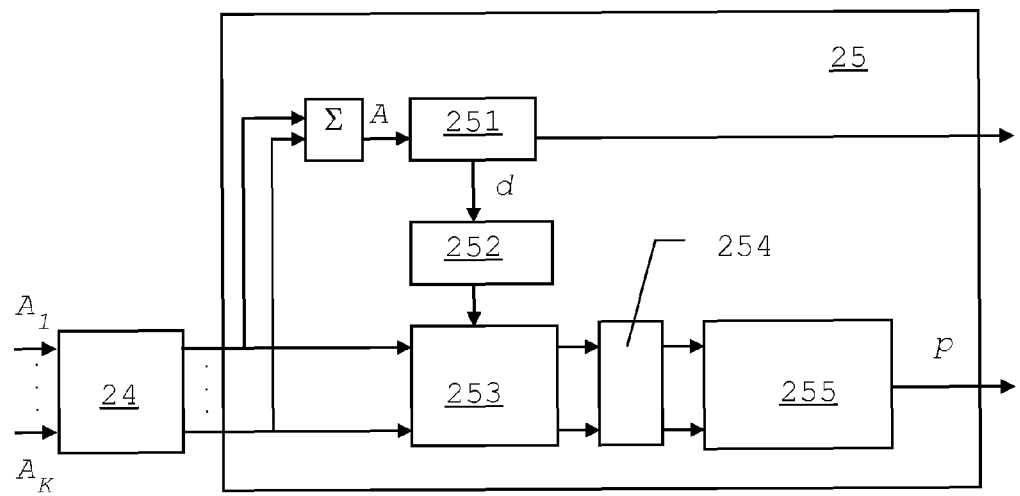
FIG. 5 shows a two-step procedure for pointing direction estimation.

The pointing direction estimation can be performed in a two-step procedure as shown in FIG. 5 where the components are designated as follows 24 Signal acquisition
25 Signal processing with subcomponents
251 Distance estimation
252 Synthesis of demodulation signal
253 Demodulation
254 Filter
255 Pointing direction estimation As a first step the distance d is measured from the sensor data $A=\Sigma_k A_k$. Details of known methods for determination of distance are not the focus of the current invention; according to the invention any suitable method of the current state-of-the art can be used to determine d. Based on the known distance, the phase-offset $4\pi d/\lambda^2$ in (24) is removed in a second step in order to generate low-bandwidth interferograms $A'_k$ $$A'_k = A_k \cdot \exp(j^{4\pi \cdot d/\lambda^2}) \tag{46}$$

As noted in equation (28), a phase-offset does not impact the evaluation of pointing direction such that these low-bandwidth signals can replace the $A_k$ for the purpose of pointing estimation. The main benefit of this procedure is that a narrow-band filter can be applied to the detector signals in order to remove noise and hence improve sensitivity of this specific embodiment. Further, the acquisition of the detector signals $A'_k$ can be performed at lower speed. Then, the filtered detector signals $A'_k$ are used to evaluate the pointing direction p, for example according to any of Eqs. (42), (44) or (45) combined with Eq. (43).

Figure 6:
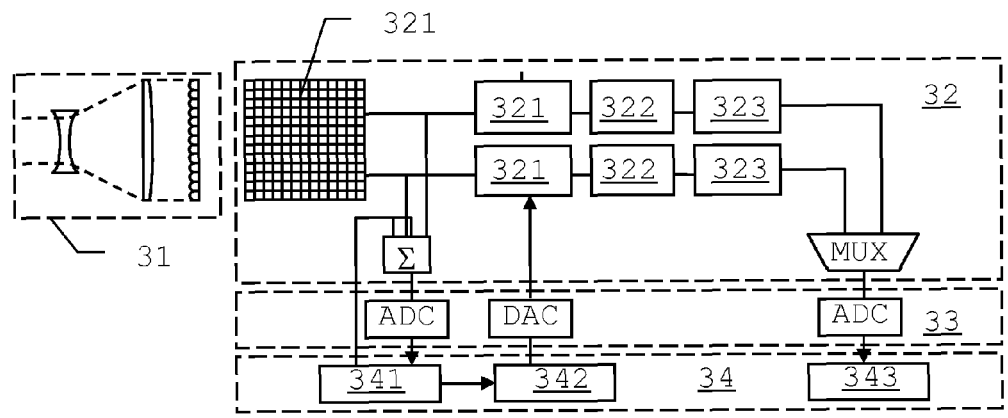
FIG. 6 shows a setup with analog demodulators for removing the phase offset.
Figure 7:
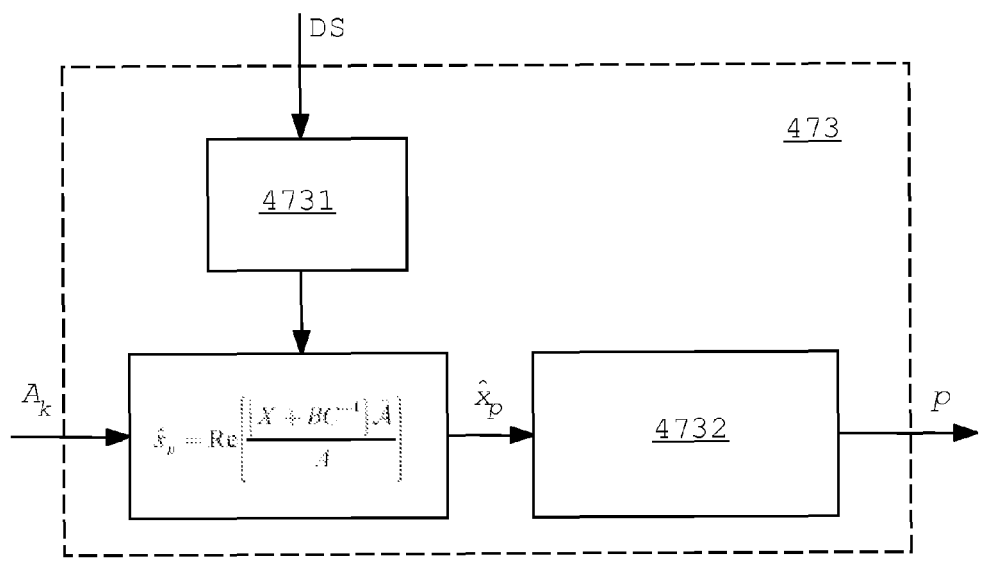
FIG. 7 shows a schematic of pointing correction.

In one embodiment it is possible to use a multi-channel data-acquisition system which performs all operations digitally. However, FIG. 6 shows a setup with analog demodulators for removing the phase offset as an alternative for another embodiment. Its components are indicated as follows 31 Imaging optics
32 Detector with subcomponents
321 Demodulator
322 Low pass filter
323 Sample and hold
MUX Multiplexer
Data acquisition interface with subcomponents
ADC Analog to digital converter
DAC Digital to analog converter
34 Processing algorithm with subcomponents
341 Distance detection
342 d generation
343 Pointing detection Here, analog demodulators are used to generate the filtered detector signals $A'_k$ by analog means. The low-bandwidth signals $A'_k$ can be sampled at low speed without loss of information. This simplifies interfacing to the detector array since the demodulated detector signals can be multiplexed to a small number of/single output line.

Figure 8:
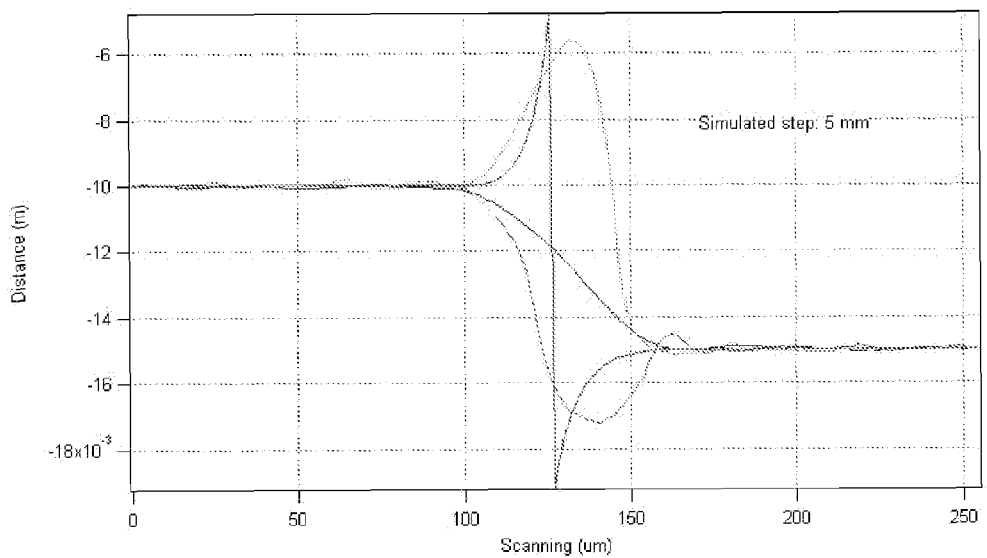
FIG. 8 shows example errors of the measured distance for scanning across a step-like feature.

FIG. 8 shows example errors of the measured distance for scanning across a step-like feature. The abscissa shows the measurement position when scanning across a step-like, diffusively reflecting feature of 5 µm height located at 125 µm. The ordinate shows the measured distance for various microscopic surface characteristics. Depending on the microscopic characteristics, the measurement may exhibit unphysical over—and undershoot effects. These measurement artefacts can be detected by observing the pointing direction while tuning the laser wavelength. Those measurements that show a large sensitivity of pointing direction to laser wavelength are identified to potentially suffer from the bat-wing effect. Therefore, the pointing direction is tracked during a frequency modulation of the laser with recorded data tagged as potentially suffering from bat-wing effect if sensitivity of pointing direction to laser wavelength is exceeding a predefined threshold. The threshold can be set as a parameter or also be automatically calculated on the basis of current or historic data.

Figure 9:
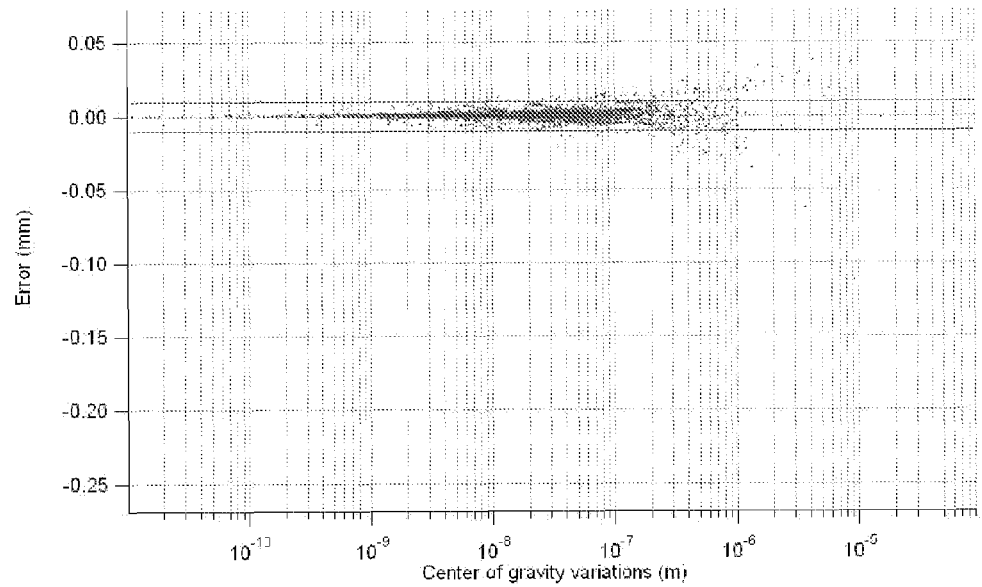
FIG. 9 shows example data of measurement error versus sensitivity of pointing direction versus wavelength.

FIG. 9 shows the result of a Monte-Carlo analysis on a diffusively reflecting step-like feature, where each dot shows the measurement error versus the sensitivity of pointing direction versus wavelength (center of gravity variation). The maximum measurement error can be limited to the two bounds shown in the graph if the measurements with a center of gravity variation above 20 nm are dropped. This demonstrates the strong correlation between measurement accuracy and sensitivity of pointing direction to laser wavelength.

What is claimed is:

1. A method for speckle mitigation in an interferometric distance meter comprising the steps:
    transmitting optical radiation with at least one wavelength $\lambda$ to a target to be surveyed;
    receiving a portion of the optical radiation scattered back by the target in an optical axis, wherein the optical radiation forms a speckle field;
    converting the received optical radiation into at least one received signal;
    determining a true distance to the target from the received signal by absolute or incremental interferometric distance measurements with compensation of phase decorrelation errors; and
    determining a pointing direction of the interferometric measurement to at least one point of the speckle field, relative to the optical axis, wherein the speckle field is at least partially resolved.

2. The method according to claim 1, wherein the speckle field is at least partially resolved using a plurality of K detectors or by moving at least one detector relative to the speckle field.

3. The method according to claim 1, wherein determining pointing direction comprises determining a pointing distance d to the corresponding point.

4. The method according to claim 1, wherein the optical radiation comprises a plurality of wavelengths as:
    a plurality of discrete wavelengths;
    a frequency modulated continuous wave; or
    white light.

5. The method according to claim 1, wherein:
    the pointing directions are estimated at a certain instance of time which is associated with distance estimation; or
    the pointing directions are continuously tracked and a weighted average is determined.

6. The method according to claim 5, wherein:
    the pointing directions are tracked during a frequency modulation of the laser, particularly with recorded data tagged as potentially suffering from bat-wing effect if sensitivity of pointing direction to laser wavelength is exceeding a predefined threshold.

7. The method according to claim 3, wherein:
    the received optical radiation is converted in parallel into a plurality of received signals $A_k$, each covering the area $D_k$ with $1 \leq k \leq K$, the detectors generating the received signals $$A_k = \int_{D_k} A(x) d^2 x$$

where x designates the spatial extension of area $D_k$.

8. The method according to claim 7, wherein the pointing direction is estimated from received signals $A_k$.

9. The method according to claim 7, wherein the pointing distances d are estimated based on the sum $A=\Sigma_k A_k$ of the plurality of received signals $A_k$.

10. The method according to claim 7, wherein:
    initially the pointing distances d are estimated based on the sum $A=\Sigma_k A_k$ of the plurality of received signals;
    subsequently a phase-offset $4\pi d/\lambda^2$ is removed in order to generate low-bandwidth interferogram signals $A'_k$; and
    the pointing direction is individually estimated from signals $A'_k$.

11. The method according to claim 1, wherein a speckle correlation structure is assumed or determined.

12. The method according to claim 11, wherein the speckle correlation structure is adapted according to the target materials to compensate for material dependencies.

13. An interferometric distance meter comprising:
    a radiation source for transmitting optical radiation with at least one wavelength X to a target to be surveyed;
    a receiver for receiving a portion of the optical radiation scattered back by the target in an optical axis and for converting the received optical radiation into at least one received signal, wherein the receiver is adapted for at least partially resolving a speckle field with a number of K detectors or a scanning device for moving at least one detector relative to the speckle field;
    an interferometer setup; and a signal processing unit with a distance estimator for determining a true distance to the target from the received signal with compensation of phase decorrelation errors, and a pointing direction estimator for determining pointing directions relative to the optical axis and for at least partially resolving the speckle field.

14. The distance meter according to claim 13, wherein the receiver comprises a multi-channel data-acquisition system with K channels for acquiring the detector signals $A_k$ individually and digitally.

15. The distance meter according to claim 13, further comprising an analog demodulators for generating interferogram signals $A'_k$.

16. The distance meter according to claim 13, wherein the receiver comprises four detectors forming a quadrant detector for resolving a single-speckle image.

* * * * *